Patented Oct. 31, 1922.

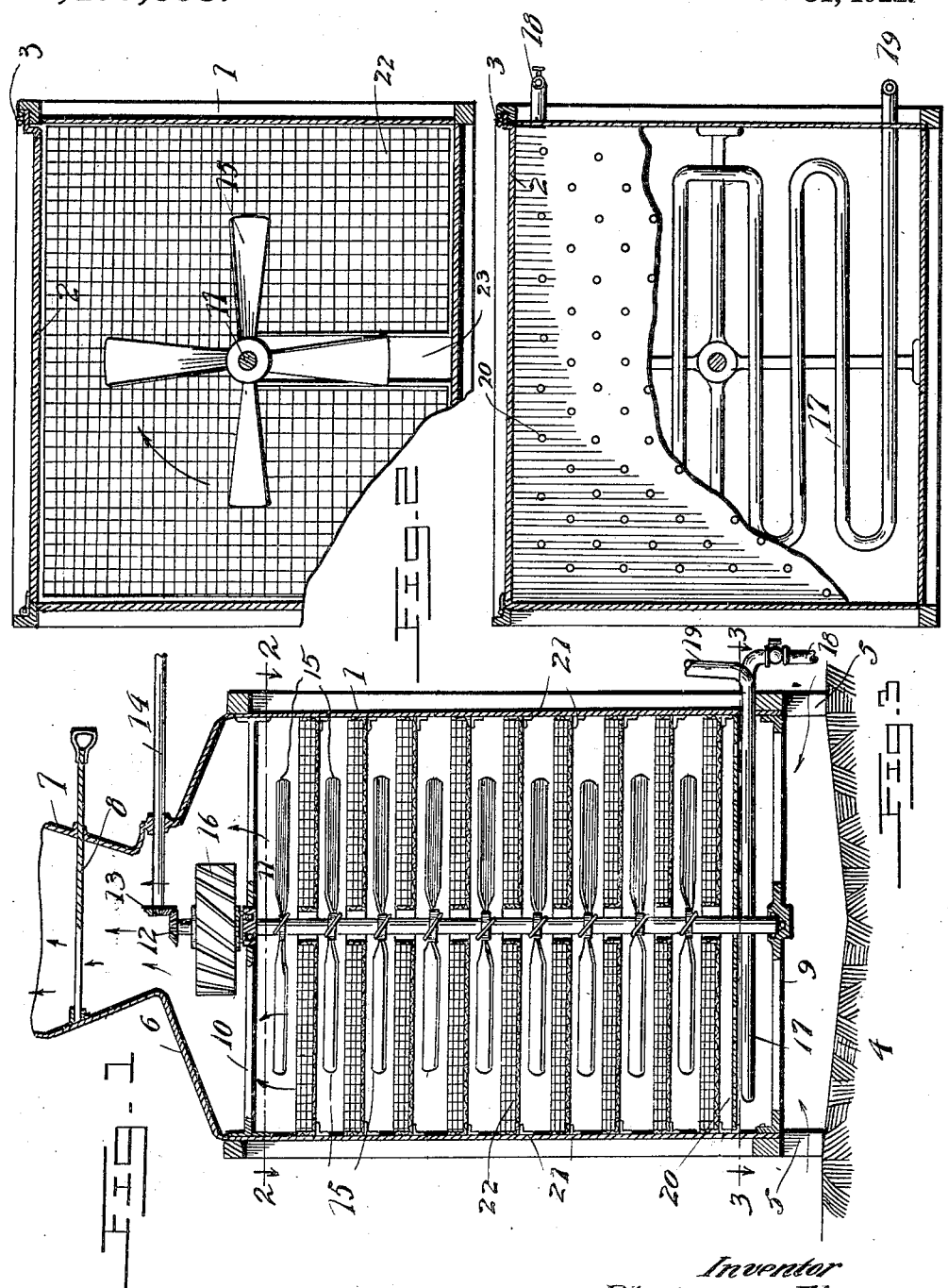

1,433,608

UNITED STATES PATENT OFFICE.

PHILORUM FLEURY, OF DOCK, QUEBEC, CANADA, ASSIGNOR OF ONE-HALF TO DAVID L. ROBERTSON, OF MONTREAL, CANADA.

DRYING APPARATUS.

Application filed November 21, 1919. Serial No. 339,701.

*To all whom it may concern:*

Be it known that I, PHILORUM FLEURY, a subject of the King of Great Britain, residing at Dock, Province of Quebec, Canada, have invented certain new and useful Improvements in Drying Apparatus; and I do hereby declare that the following is a full, clear, and exact description of the invention, such as will enable others skilled in the art to which it appertains to make and use the same.

The present invention relates to drying apparatuses and more particularly to an apparatus for drying fish and it is a purpose of the present invention to provide an apparatus of this character wherein large quantities of fish may be dried in a comparatively short time.

Herebefore it has been customary to dry fish by placing the same upon racks and subjecting the fish to the sun, which method of drying takes considerable time and labor in placing the fish in the sun and removing them to a store house every day. In the present apparatus a room or casing is provided in which the fish are placed and then they are subjected to a drying action where in the course of a few days they will be thoroughly dried and ready for shipment.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Figure 1 is a vertical section through the apparatus embodying the preferred form of the invention;

Figure 2 is a fragmental horizontal section taken on the line 2—2 of Figure 1;

Figure 3 is a horizontal section taken on the line 3—3 of Figure 1.

Referring now more particularly to the accompanying drawings wherein like and corresponding parts are designated by similar reference characters throughout the several views, The numeral 1 indicates a rectangular room or casing having a hingedly connected door 2, which is normally kept locked by means of the locking member 3. This room is supported upon and spaced from the ground 4 so as to provide inlet passageways 5 through which may pass atmospheric air. The top 6 of the room is provided with a funnel-shaped outlet 7 in which is arranged a slidably mounted damper 8, whereby this outlet may be opened and closed. Journaled within the bearing brackets 9 and 10 respectively which are arranged within the room 1, is a vertical shaft 11 and this shaft has keyed to its upper end a bevel gear 12 which meshes with a bevel gear 13 carried by the driven shaft 14, so that when power is applied to this shaft 14 the shaft 11 will also be caused to revolve. Keyed to this shaft 11 and arranged in proper spaced relation are a plurality of fans 15, the blades of which are so positioned as to create a suction, whereby the atmospheric air will be drawn through the openings 5, caused to pass through the room 1 and then forced through the outlet 7. Secured adjacent the upper end of this shaft 11 is a blower 16 which is smaller in diameter than the fans 15, but the blades of this blower 16 are so positioned as to force the air in an opposite direction to the force of air from the blades 15, so as to have a tendency to hold the air within the room.

Arranged within the bottom of the room is a heating coil 17 having an inlet 18 and an outlet 19, whereby live steam may be caused to circulate through this coil and the air and contents within the room will be heated. Arranged above this coil 17 and secured within the room 1 is a bottom plate 20 having perforations therein, so that the air and heat from the coil 17 will be properly mixed and distributed when entering the room 1. Secured to the side walls of the casing 1 are the angle plates 21 which form supports for the trays 22. The bottoms of these trays are preferably made of a wire mesh or they may be perforated in any manner, so that the air or other drying agent may readily pass therethrough, and of course suitable tops may be employed for these trays in the case they are desired to retain the fish or other objects to be dried within the trays. These trays 22 are each provided with the cut away portions 23 which are supposed to receive the vertical shaft 11.

From this construction it is apparent that when the door 2 is opened the trays are permitted to be removed from one side of the room and the fish or other objects to be dried may be removed therefrom and additional fish to be dried substituted therefor.

In using this apparatus the fish are placed upon the trays 22 and inserted within the room 1. The door 2 is then closed and the fans 15 and 16 set in operation. Live steam is permitted to travel through the coil 17 so as to heat the contents of this room. Atmospheric air or any other suitable drying agent may be drawn in through the openings 5 and this air will be pre-heated by means of the coil 17. This pre-heated air is properly distributed throughout the casing by means of the perforated plate 20 and the fans 15 one being arranged above each tray will draw this pre-heated air through the trays and around the fish contained therein for drying the same. The blower 16 will prevent the air or other drying agent from passing too rapidly through the room, so that all the objects contained therein to be dried will be fully covered by the drying agent. When it is desired to retain the drying agent within the room the damper 8 may be closed.

Having thus fully described my invention, what I claim as new and desire to secure by Letters Patent is:

1. An apparatus of the character described comprising a casing, said casing having inlet openings arranged in the bottom thereof, an outlet arranged in the top of said casing, a plurality of fish supporting trays arranged within said casing, a vertical shaft journaled within said casing, fans carried by said shaft and one of said fans being arranged above each tray, a heating coil arranged within said casing, and a distributor supported within said casing above said heating coil substantially as and for the purpose specified.

2. A drying apparatus of the character described comprising a casing, said casing having inlet openings arranged in the lower end thereof, a door hingedly connected to said casing, removable trays supported within said casing, said trays having perforated bottoms, a central vertical shaft journaled within said casing, fans carried by said shaft and a fan being arranged above each tray, a blower carried by the upper end of said shaft, a heating coil arranged within the lower end of said casing, a perforated plate secured within said casing and arranged above said heating coil, a funnel-shaped outlet secured to said casing and a valve arranged within said outlet substantially as and for the purpose specified.

3. A drying apparatus of the character described comprising a casing inlet openings arranged in the lower end of said casing, a funnel shaped outlet arranged at the upper portion of said casing, removable trays supported within the casing, said trays having perforated bottoms, bearing brackets secured within said casing, bearings carried by said brackets, a central vertical shaft journaled in said bearings, fans carried by said shaft and a fan arranged above each tray, a perforated plate secured within said casing adjacent the lower portion thereof, a heating coil arranged below said plate, a blower carried by the upper end of said shaft, a damper arranged in the funnel shaped outlet and a door for said casing substantially as and for the purpose specified.

4. A drying apparatus of the character described comprising a casing, a door for said casing, inlet and outlet openings communicating with said casing, a plurality of removable wire mesh trays arranged within the casing, brackets secured within the casing adjacent the upper and lower ends, bearings carried by said brackets, a central vertical shaft journaled in said bearings, a plurality of fans carried by said shaft, one arranged above each tray, a heating coil disposed at the lower end of said casing, a perforated plate arranged above said coil, a slidable damper mounted in the outlet opening and a blower carried by the upper end of the shaft, substantially as and for the purpose set forth.

5. An apparatus of the character described comprising a casing, a door for said casing, inlet and outlet openings for the casing, a damper slidably arranged in the outlet opening, a heating coil disposed within the lower end of the casing, a perforated plate arranged above said coil, a plurality of wire mesh trays removably supported within the casing, a central vertical shaft journaled within said casing, a plurality of fans carried by said shaft, one fan above each tray, a blower carried by the upper end of the shaft, a horizontal shaft extending within the casing and connected to some suitable driving means and inter-meshing bevel gears carried by said shaft substantially as and for the purpose set forth.

In witness whereof I have hereunto set my hand.

PHILORUM FLEURY.